(No Model.)
F. DOUGLAS.
CRANK SECURING DEVICE FOR BICYCLES.
No. 467,343. Patented Jan. 19, 1892.
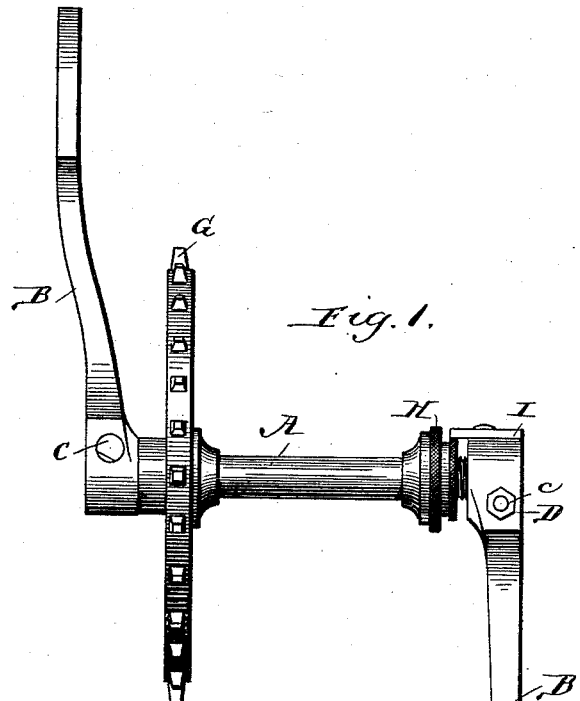
Fig. 1.
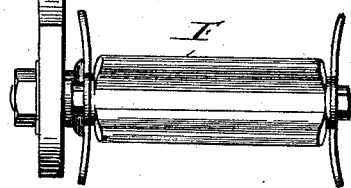
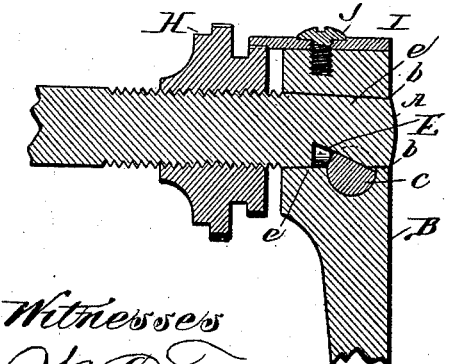
Fig. 2.
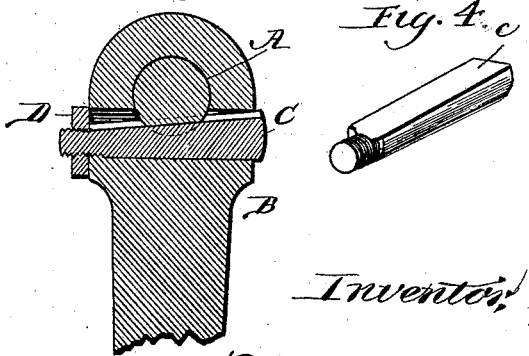
Fig. 3.   Fig. 4.
Witnesses
W. Rossiter
F. H. Mills
Inventor
Frank Douglas
By Banning & Banning
and Payson, Attys.

UNITED STATES PATENT OFFICE.

FRANK DOUGLAS, OF CHICAGO, ILLINOIS.

CRANK-SECURING DEVICE FOR BICYCLES.

SPECIFICATION forming part of Letters Patent No. 467,343, dated January 19, 1892.

Application filed August 31, 1891. Serial No. 404,236. (No model.)

*To all whom it may concern:*

Be it known that I, FRANK DOUGLAS, a citizen of the United States, residing at Chicago, State of Illinois, have invented certain new and useful Improvements in Crank-Securing Devices for Bicycles, of which the following is a specification.

This invention relates to an improvement in a bicycle pedal-crank fastening, and has for its object the securing of the pedal-crank to the axle in such a manner as to make it a tight and secure fastening, which can be easily attached and detached without injury to the fastening, and at the same time insuring that the fastening will not loosen by use or accident.

In the accompanying drawings, Figure 1 illustrates a bicycle sprocket-wheel shaft with a pedal-crank attached on each side and chain sprocket-wheel and ball-bearing adjusting-cone on the shaft, also a complete pedal on one of the cranks. Fig. 2 represents a longitudinal sectional view of the shaft with a section of the crank upon it, showing the key-seat for holding the crank onto the shaft and a cross-sectional view of the key. Fig. 3 is a sectional view of the crank-hub at the line of the center of the key, showing the keyway through the crank, and a sectional view of the key, showing its bearing on the keyway across the shaft, and a sectional view of the nut to lock the key in its place. Fig. 4 is a perspective view of the key, showing its flattened side tapered smaller at the threaded end of the key.

Like letters of reference refer to like parts of the several figures.

A represents the crank-wheel axle; B, the crank; C, the key; D, the nut for the end of the key, and E the back-angle keyway across the shaft.

F is is the pedal and the pedal-shaft complete.

G is the sprocket-wheel for the driving-chain.

H is the adjusting-cone for the ball-bearing of the driving-shaft.

I is the lock for adjusting the cone, fastened to the end of the crank by the screw *j*.

*b* represents the taper hole in the crank to fit on the shaft, and *e* the taper end of the shaft to receive the crank B.

To avoid the common annoyance of a loose crank to a bicycle which is usually fitted on a shaft with a straight bearing and an ordinary parallel flattened surface for its key, I have devised the method herein illustrated, in which the crank B is provided with a taper hole and the crank-shaft A turned on each end a corresponding taper to fit the cranks. The keyway E is cut across the shaft on a taper the opposite direction from the taper end of the shaft, and so I call it a "back-angle way," and the key C is flattened on one side and tapered thinner at the threaded end. As a result of this method of fastening, the pedaling pressure on the crank, as well as the driving of the key, has a tendency to draw the crank more firmly upon the taper bearing of the shaft *e*, making the loosening of the crank impossible without the removal of the key. A nut D, fitted to the small end of the key, serves as a lock to hold the key securely in place. To remove the crank from the shaft, the key C is driven out, and by a slight tap on the side of the crank B it is easily loosened from its taper fit and removed from the shaft.

Having thus described my invention, what I claim, and desire to secure by Letters Patent, is—

1. The combination of a bicycle crank-shaft tapered at its end and provided with a back-angle keyway cut across the shaft and inclining inwardly, a crank provided with a hole tapering to correspond to the taper end of the shaft and with a key-hole transverse to the taper-hole, and a key passing through the key-hole and bearing against the back-angle keyway, substantially as described.

2. A crank for a bicycle, provided with a taper hole to fit the tapered end of a shaft, in combination with a tapered shaft having a back-angle keyway cut across it on a slant in the opposite direction from its taper end, and a key provided with a flattened surface passing through the crank and bearing with its flattened surface against the back-angle keyway, substantially as described.

FRANK DOUGLAS.

Witnesses:
 EPHRAIM BANNING,
 SAMUEL E. HIBBEN.